United States Patent Office 3,156,713
Patented Nov. 10, 1964

3,156,713
PROCESS FOR THE PRODUCTION OF 3α-PHOS-PHATO-5β-ANDROSTANE-11-ONE
Julien Warnant, Neuilly-sur-Seine, Robert Joly, Montmorency, and André Allais and Pierre Girault, Paris, France, assignors to Roussel-UCLAF, Paris, France, a corporation of France
No Drawing. Filed July 11, 1962, Ser. No. 209,257
Claims priority, application France, July 21, 1961, 868,569, Patent 1,173,938; Oct. 20, 1961, 876,603, Patent 1,849 M
4 Claims. (Cl. 260—397.45)

The present invention relates to a method of effecting sedation, narcosis and muscular relation which comprises administering a daily dosage of from about 100 mg. to about 2 g. of a compound of the formula

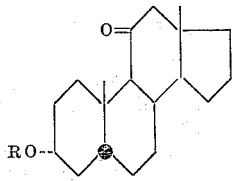

wherein R represents a radical selected from the group consisting of hydrogen and the acyl radical of a therapeutically acceptable mineral or organic acid. More particularly the invention relates to alkali metal and alkaline earth metal salts of 3α-phosphato-5-androstane-11-one and their use in effecting sedation, narcosis and muscular relaxation.

The preparation of 5β-androstane-3α-ol-11-one and its esters with lower alkanoic acids and succinic acid is described in French Patent No. 1,173,938. This French patent describes a process of preparation of 5β-androstane-3α-ol-11-one and its esters by the selective reduction of 5β-androstane-3α-ol-11,17-dione and acylation of the 5β-androstane-3α-ol-11-one thus obtained with a lower alkanoic acid and particularly acetic acid and with succinic acid. These compounds are disclosed as having interesting physiological and pharmacodynamical properties.

It is an object of the present invention to develop a method of effecting sedation, narcosis and muscular relaxation by administering a safe but effective dosage of a compound of the formula

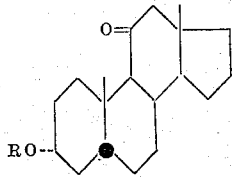

in which R represents a radical selected from the group consisting of hydrogen, the acyl radical of a therapeutically acceptable mineral acid and the acyl radical of a therapeutically acceptable organic carboxylic acid having from 1 to 12 carbon atoms.

Another object of the invention is the obtention of phosphate esters of the formula

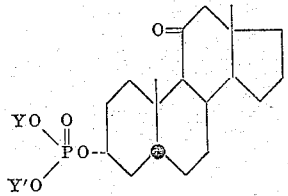

wherein Y and Y' are selected from the group consisting of hydrogen and alkali metals and together represent divalent alkaline earth metals.

A further object of the invention is to develop a process for the production of said 3α-phosphato-5β-androstane-11-ones.

Another object of the invention is to obtain the novel intermediate 3α-dibenzylphosphato-5β-androstane-11-one.

These and other objects of the invention will become more apparent as the description thereof proceeds.

We have now found that 5β-androstane-3α-ol-11-one and its esters with the acids enumerated in the aforesaid French patent as well as with other acids including mineral acids are useful in inducing sedation, narcosis and muscular relaxation when administered in daily dosages of from about 100 mg. to about 2 g. More particularly, we have found that administration of the phosphoric acid ester of 5β-androstane-3α-ol-11-one of the formula

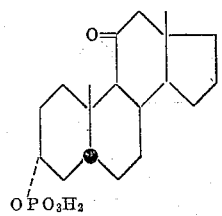

as well as its alkali metal and alkaline earth metal salts, such as the disodium salt of 3α-phosphato-5β-androstane-11-one, is particularly effective, especially when administered in the form of the water-soluble salts. These phosphoric acid esters are novel and the invention also extends to them, their preparation and their intermediates.

5β-androstane-3α-ol-11-one occurs in the form of a solid colorless compound, crystallized in prisms, soluble in acetone, benzene, chloroform, alcohol and ether, slightly soluble in isopropyl ether, insoluble in water. Its melting point determined on the Maquenne block is 131° C., specific rotation $[\alpha]_D^{20} = +56.5°$ (c.=1% in acetone).

3α-acetoxy-5β-androstane-11-one occurs in the form of a solid colorless compound crystallized in needles, soluble in alcohol, acetone and methanol, insoluble in water. Its melting point is 130.5° C. and its specific rotation $[\alpha]_D^{20} = +74°$ (c.=0.5% in acetone).

3α-succinoyloxy-5β-androstane-11-one occurs in the form of a colorless solid compound crystallized in needles, soluble in acetone, benzene, chloroform, alcohol, ether and dilute aqueous alkalis, insoluble in water. Its instantaneous melting point is 125–126° C. and its specific rotation $[\alpha]_D^{20} = +67° \pm 1.5°$ (c.=1% in acetone).

While the above compounds, derivatives of compounds of the formula

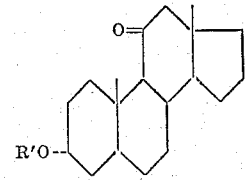

wherein R' represents hydrogen, lower alkanoyl or succinoyl are effective in the induction of sedation, narcosis and muscular relaxation according to the invention, they are insoluble in water and must be administered in suspension.

As indicated above the mineral salts of the phosphoric acid ester of 5β-androstane-3α-ol-11-one possess, in addition, the advantage of being soluble in water.

The process of producing the phosphoric acid ester of 5β-androstane-3α-ol-11-one, I, and its mineral salts, also part of the invention, is characterized essentially in that 5β-androstane-3α-ol-11-one, II, is subjected to the action of a functional derivative of phosphoric acid, such as a dibenzyl phosphonate halide. 3α-dibenzylphosphato-5β-androstane-11-one, III, is obtained which is subjected to catalytic hydrogenolysis to give 3α-phosphato-5β-androstane-11-one, I, whose 3α-phosphato group is transformed if desired into an alkali metal salt such as the disodium salt, IV.

In the above description of the process, the Roman numerals refer to the formulas in the flow diagram of Table I.

TABLE I

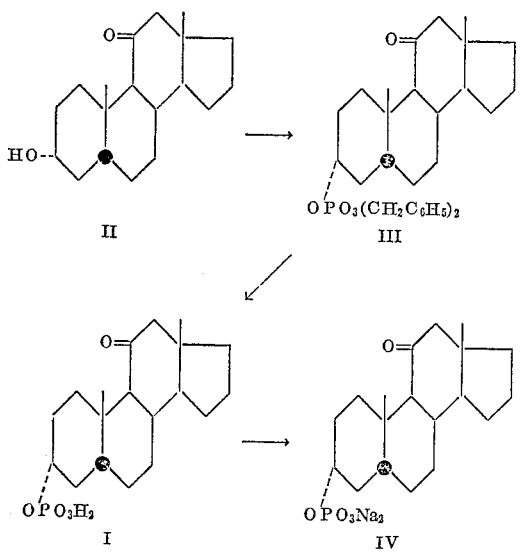

In its preferred method of execution, the process above can be characterized by the following points:

(a) The functional derivative of the phosphoric acid used is the dibenzylchlorophosphonate in the form of an ethereal solution and the reaction was conducted at a temperature between about —15° C. and +5° C.

(b) The hydrogenolysis of the dibenzylphosphato group is made in the presence of palladized carbon black in ethanolic media at about room temperature;

(c) The salt formation of the 3α-phosphato group is made by neutralization with sodium ethylate.

3α-phosphato-5β-androstane-11-one occurs in the form of a colorless solid compound, crystallized in prisms, soluble in alcohol, and dilute aqueous alkalis, insoluble in water, ether, acetone, benzene and chloroform. Its melting point is 258–260° C. and its specific rotation $[\alpha]_D^{20} = +70.6°$ (c.=0.5% in methanol).

The disodium salt of 3α-phosphato-5β-androstane-11-one is obtained in the form of a hydrate containing 3 molecules of water. It is a solid, crystallized in colorless leaflets, soluble in water and insoluble in organic solvents. Its instantaneous melting point is more than 400° C. and its specific rotation $[\alpha]_D^{20} = 55.7°$ (c.=1% in water).

All of these products possess interesting pharmacological properties. They possess particularly a neurotropic and depressive action on the central nervous system.

They can be used for the treatment of neurotic states and insomnia following asthenia, of nervous depressions, of overwork, of spasms, of neurosis or all manifestations of irritability, of anguish or of nervousness.

The water-soluble esters such as the 3-phosphate can be used also in general anesthesia and in the treatment of crisis of delirium, as well as in obstetrics in order to facilitate delivery, alone or in association with other medicines.

In addition, 5β-androstane-3α-ol-11-one and its esters possess depressive properties on the medullary centers. They provoke relaxation of muscles in the state of contraction. They attenuate cramps, myalgia and curvatures. They can be used in order to combat manifestations due to intoxication by strychnine and other medullary poisons.

The 5β-androstane-3α-ol-11-one and its esters are administered by oral methods, by transcutaneous methods or by rectal methods.

They can be utilized in the form of solutions, injectable suspensions, prepared in ampules or in multiple dose flacons, in the form of tablets or suppositories. The dosology is controlled between about 100 mg. and about 2 g. per day in the adult as a function of the method of administration.

Pharmaceutical forms such as solutions or injectable suspensions, tablets, and suppositories are prepared according to the usual procedures.

The following examples are illustrative of the invention and will enable those skilled in the art to practice the same; they are not to be deemed to limit the invention in any manner. The Roman numerals refer to the formulas in Table I.

*Example I*

PREPARATION OF 3α-PHOSPHATO-5β-ANDROSTANE-11-ONE, I

*Step A.*—*Preparation of 3α-dibenzylphosphato-5β-androstane-11-one, III.*—9.5 g. of dibenzylphosphite were introduced into 18 cc. of ether. Then 4.8 g. of N-chlorosuccinimide were added thereto in small amounts over a period of about 30 minutes under agitation while maintaining the temperature between 25 and 30° C. The agitation was continued for a period of 15 minutes and next the mixture was cooled to +5° C. The precipitate formed was vacuum filtered and washed with ether. The filtrate and the ether wash liquids were combined. Then the solution of dibenzylchlorophosphonate, $(C_6H_5—CH_2O)_2POCl$ so obtained was brought to a volume of 27 cc. by the addition of ether.

At the same time, 3 g. of 5β-androstane-3α-ol-11-one, II, were dissolved in 30 cc. of anhydrous pyridine. The mixture was subjected to agitation under an atmosphere of nitrogen and cooled to —10° C. Then, in a single amount, 24 cc. of the solution of dibenzylchlorophosphonate obtained as described above were introduced. The agitation was continued for a period of 2½ hours at about —5° C. The mixture was allowed to stand overnight at 0° C., then poured into iced water and extracted several times with methylene chloride. The extracts were combined, washed successively with N-hydrochloric acid, with salt water, with a solution of sodium hydroxide and again with salt water. The extracts were dried over sodium sulfate, filtered and the filter washed several times with methylene chloride. The filtrate and the methylene wash liquors were combined and distilled to dryness. Raw compound III was obtained which was purified by chromatography through magnesium silicate with elution with methylene chloride containing 1.6% of methanol. The combined eluates were taken up in isopropyl ether and crystallized. The crystals obtained were vacuum filtered, triturated with cold isopropyl ether and dried under vacuum. 3.8 g. of 3α-dibenzylphosphato-5β-androstane-11-one, III, were obtained which could be recrystallized again from isopropyl ether to give a product having a melting point of 82° C. and a specific rotation $[\alpha]_D^{20} = +49.5°$ (c.=1% in methanol).

The product is soluble in alcohol, ether, acetone, benzene and chloroform; insoluble in water.

*Analysis.*—$C_{33}H_{43}O_5P$; molecular weight=550.6. Calculated: C, 71.97%; H, 7.87%; P, 5.62%. Found: C, 72.3%; H, 7.7%; P, 5.8%.

This compound is not described in the literature.

The starting compound was prepared according to the method described in French Patent No. 1,173,938.

*Step B.*—*Preparation of 3α-phosphato-5β-androstane-11-one, I.*—4 g. of 3α-dibenzylphosphato-5β-androstane-11-one, III, were introduced into 40 cc. of ethanol. 0.5 g. of palladized carbon black containing 10% of palladium was added thereto. The hydrogenation was effected over a period of 5 minutes under agitation and at room temperature. Then the reaction mixture was allowed to stand under an atmosphere of hydrogen and with agitation for a period of about 25 minutes. Next the catalyst was separated and washed with ethanol. The filtrate and the ethanol wash liquors were combined and evaporated to dryness. 2.6 g. of raw 3α-phosphato-5β-androstane-11-one, I, were obtained. 3α-phosphato-5β-androstane-11-one was purified by solution at elevated temperatures in aqueous acetone, filtration at elevated temperatures, addition of water and crystallization while cold. The purified product had a melting point of 258–260° C. and a specific rotation $[\alpha]_D^{20}=+70.6°$ (c.=0.5% in methanol).

It is soluble in alcohol and dilute aqueous alkalis; insoluble in water, ether, acetone, benzene and chloroform.

*Analysis.*—$C_{19}H_{31}O_5P$; molecular weight=370.4. Calculated: C, 61.60%; H, 8.43%; P, 8.36%. Found: C, 61.6%; H, 8.4%; P, 8.5%.

This compound is not described in the literature.

*Step C.*—Preparation of disodium salt of 3α-phosphato-5β-androstane-11-one, IV.—The disodium salt of 3α-phosphato-5β-androstane-11-one was obtained by action of sodium ethylate on an ethanolic solution of 3α-phosphato-5β-androstane-11-one, I. The disodium salt has a melting point in excess of 400° C. and a specific rotation $[\alpha]_D^{20}=+55.7°$ (c.=1% in water). (The product contained 11% water of solvatation.)

The product is soluble in water, soluble in hot alcohol, insoluble in ether, acetone, benzene and chloroform.

*Analysis (after correction for solvatation).*—$C_{19}H_{29}O_5PNa_2$; molecular weight=414.4. Calculated: C, 55.06%; H, 7.05%; P, 7.47%. Found: C, 55.4%; H, 7.1%; P, 7.7%.

This compound is not described in the literature.

Example II

PHARMACOLOGICAL STUDIES (a) *5β-androstane-3α-ol-11-one. Study of neuro-depressor effect.*—Finely ground 5β-androstane-3α-ol-11-one was placed in suspension in water and injected by intraperitoneal methods in mice. A sedative effect on the central nervous system was noted which was accentuated with increased dosages and terminated with a narcotic effect which was shown by the loss of the straightening reflex, a test in which an animal lying on its back is no longer able to raise itself.

This narcotic effect was obtained about 10 minutes after intraperitoneal administration of the medicine and its duration varied with the dose of the medicine injected. Table II below shows the results obtained on different lots of mice.

TABLE II

| Injected dose | Duration of narcosis in minutes | Average duration, minutes |
|---|---|---|
| 100 mg./kg. | 20—55—55—60—65 | 51 |
| 200 mg./kg. | 60—70—110—120—120 | 96 |

The sleep obtained by injection of 5β-androstane-3α-ol-11-one was particularly calm and the muscular relaxation was very marked. There was no pre-anesthesic agitation. Awakening was very rapid without provoking any agitational phase. In weaker doses than 50 mg./kg., narcosis was not complete. Only a certain somnolence was observed with considerable muscular hypotonia. Weaker does (10 and 20 mg./kg.) provoked no somnolence. Only a state of quietude appeared with the same muscular hypotonia as that observed with greater dosages. It was noted in particular that the reflexes of the animals and their response to outside stimuli remained in the normal limits.

(b) *3α-phosphato-5β-androstane-11-one. Study of the neuro-depressor effect.*—3α-phosphato-5β-androstane-11-one in solution in physiological serum was injected by intravenous methods in different lots of mice at progressively increasing dosages. A profound sedative effect was observed on the central nervous system going to narcosis with increase of the dosage. The narcotic effect was measured in the same manner as for the 5β-androstane-3α-ol-11-one by the loss of the straightening reflex. Table III below shows the results obtained with different lots of mice.

TABLE III

| Doses injected | Duration of sleep in minutes | Average, minutes |
|---|---|---|
| 100 mg./kg. | 35—45—40—45—85 | 48 |
| 200 mg./kg. | 85—135—170—235 | 156 |

DETERMINATION OF TOXICITY (a) *5β-androstane-3α-ol-11-one.*—Lots of 10 mice of the Rockland strain weighing between 20 and 22 g. received by intraperitoneal injection an aqueous suspension of 5β-androstane-3α-ol-11-one at increasing dosages from 100 mg. to 1 g. per kg. The animals were held under observation for a period of one week. In a general manner, no mortality was observed at a dose of 500 mg./kg. Very much increased dosages of 1 gram per kg. gave, by contrast, a general mortality. The average lethal dose ($DL_{50}$) could be evaluated at about 600–700 mg./kg.

(b) *3α-phosphato-5β-androstane-11-one.*—3α-phosphato-5β-androstane-11-one in solution in physiological serum was administered to lots of ten mice of the Rockland strain weighing between 18 and 22 grams by intravenous injection in increasing dosages. The different lots received, respectively, 100, 200 and 500 mg./kg. of 3α-phosphato-5β-androstane-11-one. The animals were held under observation for a period of one week. No mortality was noted at a dosage of 100 mg./kg.

One death out of five animals was observed at a dose of 200 mg./kg. and a general mortality for the very large dose of 500 mg./kg. was observed. The average lethal dose ($DL_{50}$) for 3α-phosphato-5β-androstane-11-one is thus to be evaluated at about 250 mg./kg.

It will be understood that the invention is not limited to the specific modes of execution described above. Particularly, it is evident to one skilled in the art that equivalent techniques, such as the use of other therapeutically acceptable esters, may be employed without departing from the spirit of the invention or the scope of the appended claims.

We claim:

1. The process of producing phosphate esters of the formula

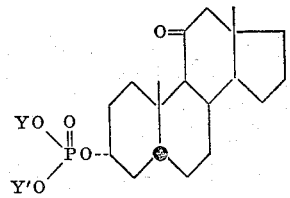

wherein Y and Y' are selected from the group consisting of hydrogen and alkali metals and together represent divalent alkaline earth metals, which comprises the steps of reacting 5β-androstane-3α-ol-11-one with a dibenzylphosphonate halide, subjecting the 3α-dibenzylphosphato-5β-androstane-11-one to the action of hydrogen in the presence of a hydrogenolysis catalyst in an inert organic solvent and recovering said phosphate esters.

2. The process of claim 1 wherein said dibenzylphosphonate halide is dibenzyl chlorophosphonate in the form of an ethereal solution.

3. The process of claim 1 wherein the hydrogenolysis of the dibenzylphosphato group is made in the presence of palladized carbon black in ethanol.

4. The process of producing the disodium salt of 3α-phosphato-5β-androstane-11-one which comprises the steps of reacting a pyridinic solution of 5β-androstane-3α-ol-11-one with dibenzyl chlorophosphonate in an ethereal solution at a temperature between about −15° C. and about +5° C., subjecting the 3α-dibenzylphosphato-5β-androstane-11-one to the action of hydrogen in the presence of palladized carbon black in an inert organic solvent, reacting 3α-phosphato-5β-androstane-11-one with an ethanolic solution of sodium ethylate and recovering said disodium salt of 3α-phosphato-5β-androstane-11-one.

References Cited in the file of this patent

UNITED STATES PATENTS

| | | |
|---|---|---|
| 2,806,863 | Herr | Sept. 17, 1957 |
| 2,813,883 | Herr | Nov. 19, 1957 |
| 2,928,849 | Diczfalusy et al. | Mar. 15, 1960 |
| 2,976,213 | Murphey | Mar. 21, 1961 |
| 3,057,780 | Shapiro | Oct. 9, 1962 |
| 3,081,316 | Sakakibara et al. | Mar. 12, 1963 |

FOREIGN PATENTS

| | | |
|---|---|---|
| 1,173,938 | France | Nov. 3, 1958 |